United States Patent [19]
Yamauchi et al.

[11] Patent Number: 4,961,039
[45] Date of Patent: Oct. 2, 1990

[54] MOVING OBJECT DETECTING DEVICE

[75] Inventors: Kazumasa Yamauchi; Hiromitsu Inoue; Susumu Katayama, all of Kadoma, Japan

[73] Assignee: Matsushita Electric Works, Ltd., Osaka, Japan

[21] Appl. No.: 174,169

[22] Filed: Mar. 28, 1988

[30] Foreign Application Priority Data

| Apr. 3, 1987 [JP] | Japan | 62-83444 |
| Oct. 27, 1987 [JP] | Japan | 62-270770 |
| Jan. 26, 1988 [JP] | Japan | 63-15018 |
| Jan. 26, 1988 [JP] | Japan | 63-15019 |

[51] Int. Cl.⁵ .................................... G08B 13/18
[52] U.S. Cl. ........................ 340/554; 367/94; 342/28
[58] Field of Search ............ 340/554; 367/94; 342/417, 28

[56] References Cited

U.S. PATENT DOCUMENTS

| Re. 30,288 | 5/1980 | Hackett | 340/554 |
| 3,665,443 | 5/1973 | Galvin | 367/94 |
| 3,733,581 | 5/1973 | Kalmus | 342/28 |
| 3,760,400 | 9/1973 | Galvin et al. | 342/28 |
| 3,796,989 | 3/1974 | Ravas et al. | 367/94 |
| 3,878,526 | 4/1975 | Pedersen | 342/28 |
| 4,114,146 | 9/1978 | Inoue et al. | 367/93 |
| 4,225,858 | 9/1980 | Cole et al. | 340/554 |
| 4,287,579 | 9/1981 | Inoue et al. | 367/94 |

Primary Examiner—Joseph A. Orsino
Assistant Examiner—Jeffery A. Hofsass
Attorney, Agent, or Firm—Burns, Doane, Swecker & Mathis

[57] ABSTRACT

A moving object detecting device is arranged for detection in time series of an angle of respective received-wave signals at every moment with respect to basic axes in a vector plane, the basic axes being a pair of intermediate signals obtained by converting frequency deviation components of the received-wave signals responsive to incident on a wave receiver of reflected waves of radiated energy by a wave radiator from an object moving in a supervisory zone. Such moving object can be thereby detected at a high precision, irrespective of how quickly or slowly it moves within the zone.

3 Claims, 8 Drawing Sheets

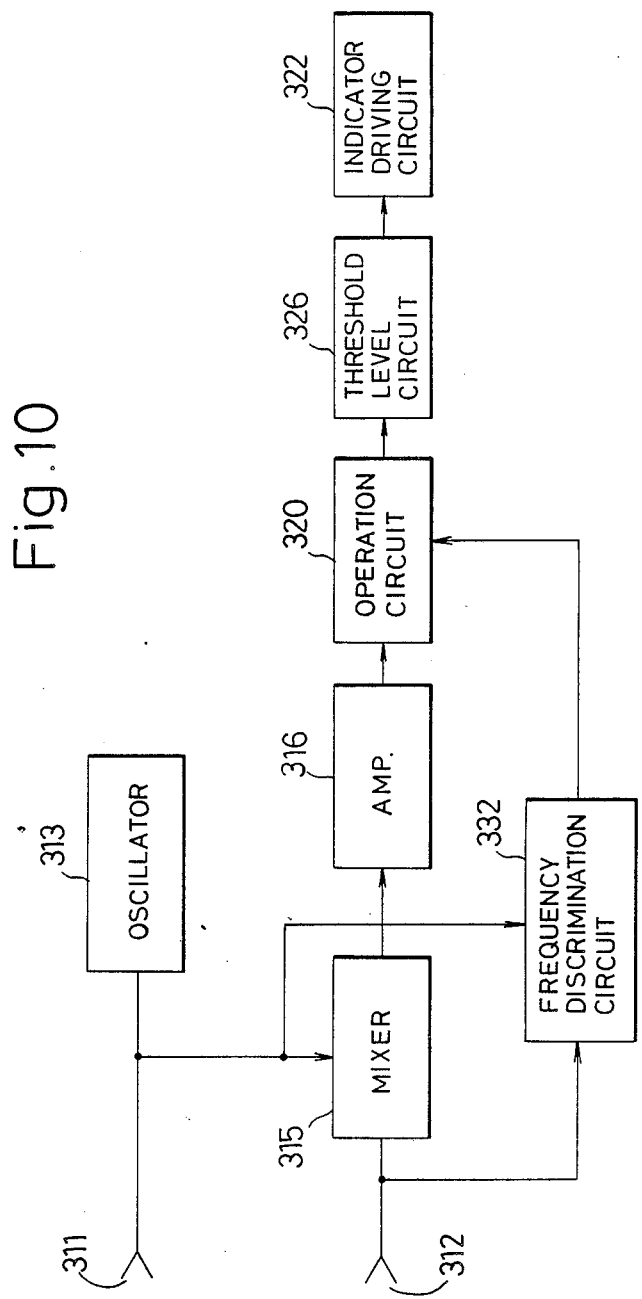

MOVING OBJECT DETECTING DEVICE

TECHNICAL BACKGROUND OF THE INVENTION

This invention relates to a moving object detecting device for detecting an object moving in a supervisory zone by radiating over the zone such continuous energy waves as ultrasonic waves, microwaves or the like, and detecting frequency deviation of reflected waves from the object caused by its movement.

1. Disclosure of the Prior Art

Generally, the moving object detecting devices of the kind referred to are arranged for keeping such continuous energy waves as ultrasonic waves, microwaves or the like of a predetermined frequency radiated over the supervisory zone, and detecting the frequency deviation in the reflected waves caused as the Doppler effect in response to the movement of the object present in the supervisory zone.

In U.S. Pat. No. 4,287,579 to H. Inoue et al, assigned to the same assignee as in the present case, there has been disclosed a moving object detecting device forming an earlier invention of the present invention. In this device of Inoue et al, ultrasonic waves are radiated from a wave radiator to the supervisory zone, the reflected waves from any object present in the zone are received by a wave receiver and converted into electric signals, and such electric signals are further converted into a pair of intermediate signals (beat signals). The device is arranged so that the pair of the intermediate signals are converted to binary axial code signals corresponding to the polarity of the intermediate signals, a logic sum of the pair of the intermediate signals is taken to discriminate the presence of the object within the supervisory zone, a detection is made to determine in which one of quadrants of vector plane having the intermediate signals as its basic axes the reflected waves from the object are present, positional shift in the quadrants as well as moving direction of the object are detected, and these information detected on the object are indicated by means of any proper indicating means.

In the foregoing device of Inoue et al, however, the presence of the moving object is. to be discriminated by means of, so to say, a time for which the object moves continuously in a fixed direction, and there has arisen such a problem that a presence in the supervisory zone of such a slowly moving but inherently stationary article as a curtain which swings would cause an object's shift detecting means actuated to provide signals responsive to swinging direction and the like even though the article has practically made no substantial shift from the viewpoint of shifting distance, and a malfunction of the device has been thereby caused to occur. In an event when such malfunction is attempted to be avoided by inserting, in the device at a stage preceding the indicating means, such time constant means as an integrating means so as to prolong the time constant, there arise another problem that any object which rapidly moves within the supervisory zone can be no more detected.

2. Field of Art

It is the primary object of the present invention, therefore, to provide a moving object detecting device capable of detecting the presence of a moving object within the supervisory zone exactly and at a high precision, irrespective of its moving velocity.

According to the present invention, this object is attained by a moving object detecting device arranged so that an output of an oscillating means which oscillates at a predetermined frequency is provided to a wave radiator for radiating in a supervisory zone continuous energy waves, reflected waves of said continuous energy back from an object present in the supervisory zone are made incident on a wave receiver, a received-wave signal from said wave receiver is converted by a converter into a pair of intermediate signals forming basic axes of a vector plane, positional shift and moving direction of the object on said vector plane are detected by a detecting means, and thereby detected information of the moving object is made acknowledgeable by an indicating means, characterized in that an angle of the received-wave signal at every moment with respect to said basic axes in the vector plane is detected in time series by an angle detecting means, any angular difference at respective moments is operated by an operating means and, when a predetermined level of said difference is detected, a signal processing means provides an object detection signal to a detection indicating means.

With the moving object detecting device of such arrangement as above of the present invention, it is made possible to detect the moving object present in the supervisory zone highly precisely, irrespective of moving velocity of the object, by detecting in time series an angular deviation information of the moving object from the pair of intermediate signals obtained, in particular, through a conversion of energy deviation components of the received-wave signal.

Other objects and advantages of the present invention should be made clear in following description of the invention detailed with reference to preferred embodiments of the invention shown in accompanying drawings.

BRIEF EXPLANATION OF THE DRAWINGS

FIG. 10 is a block diagram showing a further embodiment of the device according to the present invention.

Figure 1:
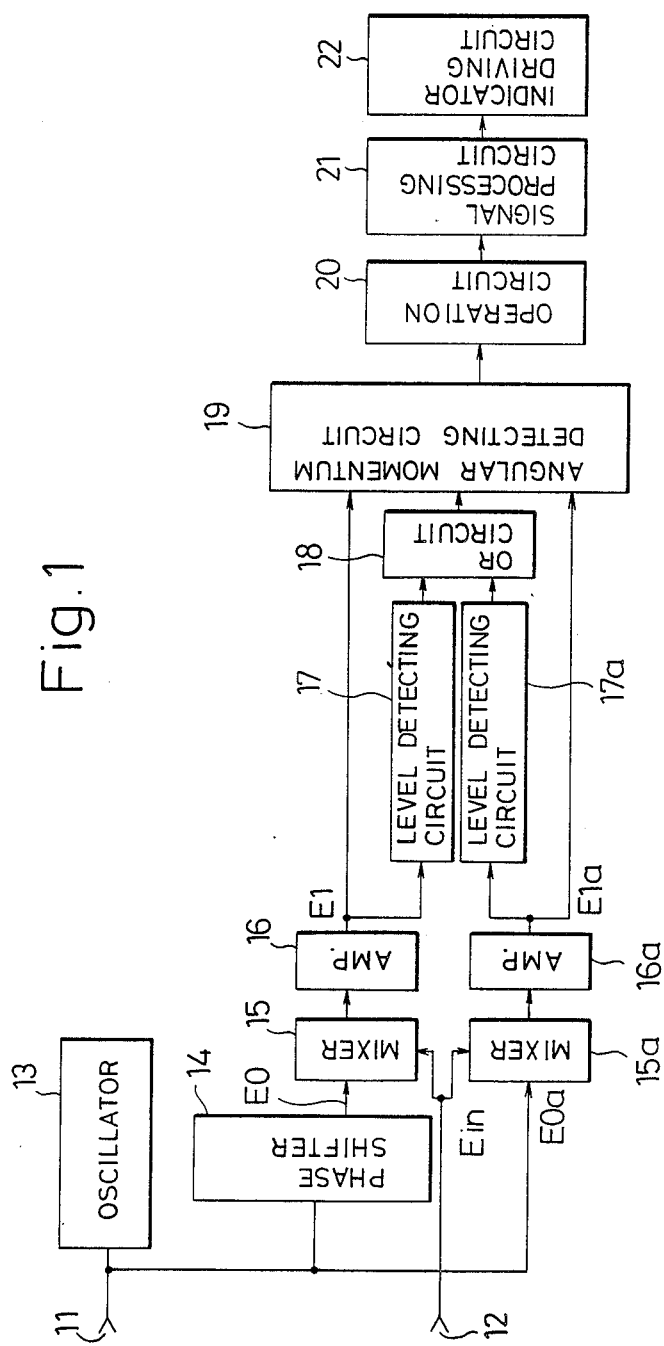
FIG. 1 is a block diagram of the moving object detecting device in an embodiment according to the present invention.

While the present invention shall now be explained with reference to the embodiments shown in the drawings, it should be appreciated that the intention is not to limit the invention only to these embodiments shown therein but to rather include all modifications, alterations and equivalent arrangements possible within the scope of appended claims.

While in the respective embodiments hereinafter referred to a use of ultrasonic wave is shown as an example of the continuous energy waves radiated to the supervisory zone, it may be also possible to employ, for example, microwaves or the like.

DISCLOSURE OF PREFERRED EMBODIMENTS

Referring to FIG. 1, there is shown an embodiment of the moving object detecting device according to the present invention, which comprises a wave radiator 11 for radiating ultrasonic waves as continuous energy waves to a supervisory zone, and a wave receiver 12 on which reflected ones of the continuous energy waves back from an object present in the supervisory zone are made incident. The wave radiator 11 is driven by an output signal from an oscillating circuit 13 which sequentially oscillates at a constant frequency. When the object is present in the supervisory zone and the ultrasonic waves reflected by the object are incident on the wave receiver 12, a received-wave signal Ein is generated as an electric signal in the receiver 12. These wave radiator and receiver 11 and 12 are both formed by a piezo-electric element for radiating from the radiator 11 the ultrasonic waves conforming to the frequency of the output from the radiator 11 and, accordingly, the received-wave signal Ein is provided as an output of the receiver 12 as conformed to the frequency of the ultrasonic waves.

The received-wave signal Ein is provided to a converter for converting it into a pair of intermediate signals E1 and E1a, and this converter comprises a phase shifter 14 for advancing by 90 degrees the phase of the output signal from the oscillating circuit 13, a pair of mixers 15 and 15a providing the pair of intermediate signals E1 and E1a which are beat signals respectively of output signal EO of the phase shifter 14 and received-wave signal Ein as well as the output signal EOa of the oscillating circuit 13 and received-wave signal Ein, and a pair of amplifying circuits 16 and 16a for amplifying respectively each of the intermediate signals E1 and E1a. Outputs of these amplifying circuits 16 and 16a are subjected to a discrimination at level detecting circuits 17 and 17a to determine whether or not they are respectively of a level higher than a predetermined so that, when at least one of the intermediate signals E1 and E1a is above the predetermined level, an output of an OR circuit 18 will be at "H" level. That is, when the received-wave signal Ein from the supervisory zone is the one which generating a frequency deviation due to the moving object with respect to the output signal of the oscillating circuit 13, the OR circuit 18 provides the "H" level output.

Figure 2:
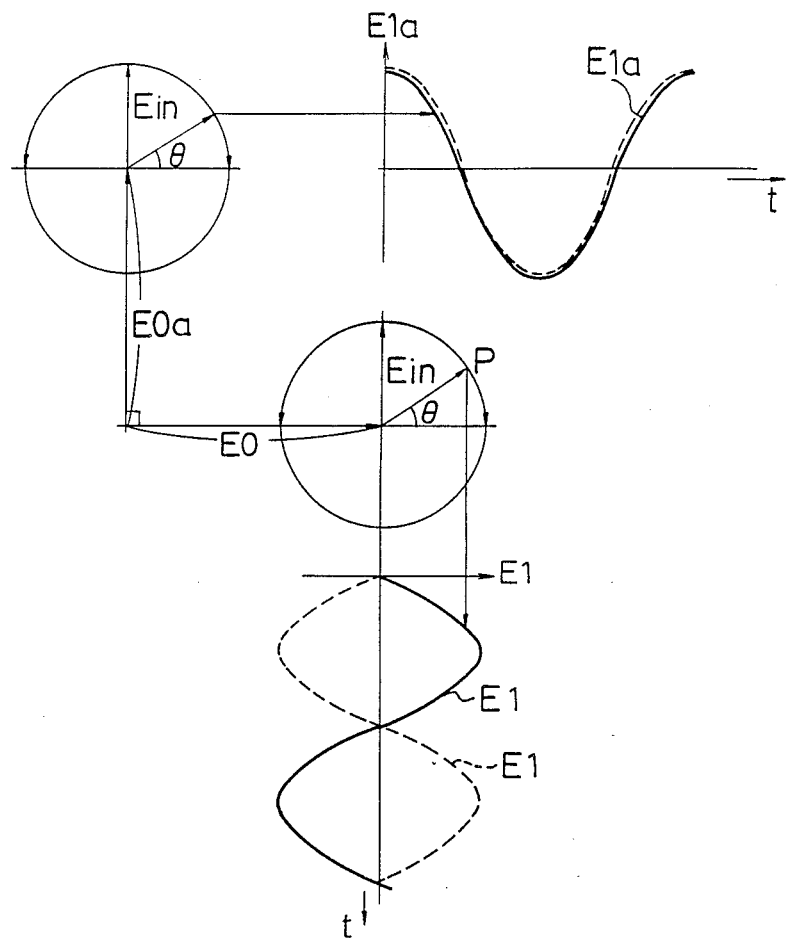
FIGS. 2 and 3 diagrams for explaining the operation of the moving object detecting device of FIG. 1.

Referring also to FIG. 2 in which the output signal EO is assumed to be a reference vector while its phase angle with respect to the received-wave signal Ein is assumed to be 0, there is satisfied such a relationship between the both intermediate signals E1 and E1a as a following formula, as will be clear from FIG. 2:

$$E1=|Ein|\cdot\cos\theta, \ E1a=|Ein|\cdot\sin\theta$$

Figure 3:
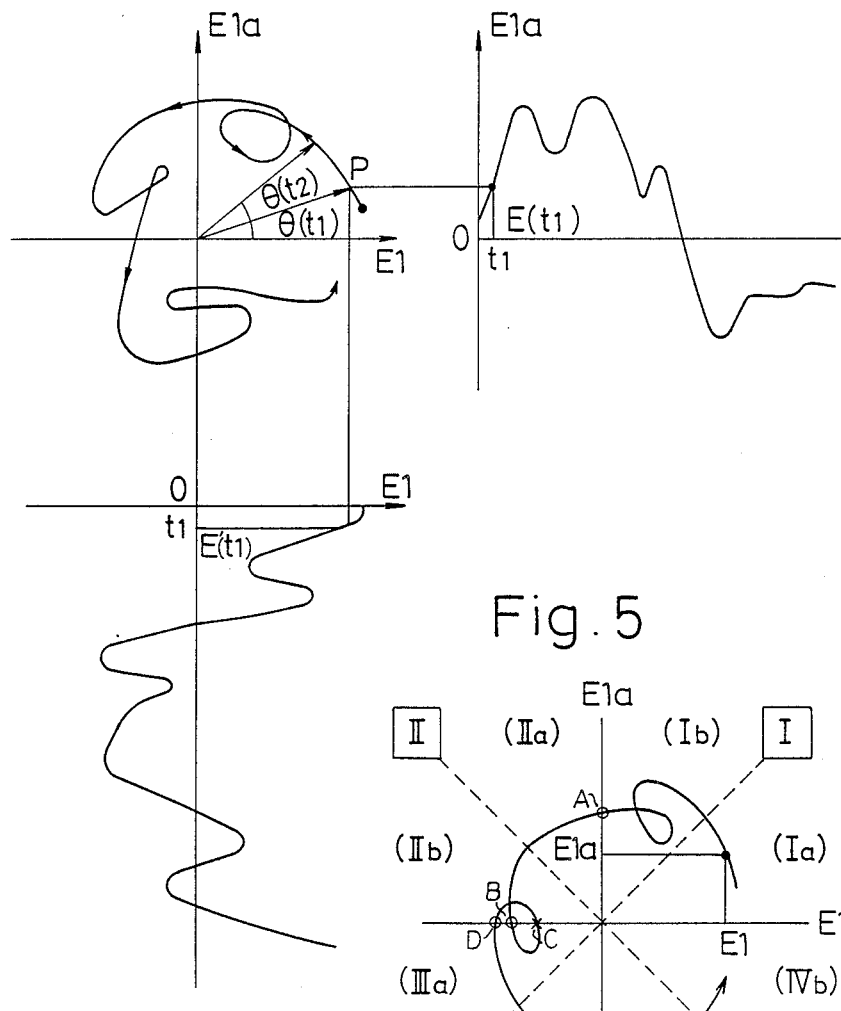

That is, one of these intermediate signals, E1, will be advanced in phase by 90 degrees from that of the other intermediate signal E1a, as shown by a dotted line curve in FIG. 2, when the object is approaching the wave receiver 12 within the supervisory zone, whereas the object separating from the wave receiver 12 causes the phase to be delayed by 90 degrees as shown by a solid line curve in FIG. 2. While in the drawing the intermediate signals E1 and E1a are represented by sine curves, the moving object will be practically of a complicated shape involving undulated surface so that the received-wave signal Ein will be a composite vector of reflected waves at various positions in the undulated surface, and the intermediate signals E1 and E1a will be of such distorted wave forms as shown in FIG. 3. In all events, the received-wave signal Ein is to denote a single point P on a plane of rectangular coordinates, which basic axes are the intermediate signals E1 and E1a, even when the received-wave signal Ein is the composite vector of many components.

Referring more specifically thereto by reference to FIG. 3, values E1(t1) and E1a(t1) at a time point t1 of the intermediate signals E1 and E1a are plotted on the plane of the rectangular coordinates of which the basic axes are the intermediate signals E1 and E1a, then the received-wave signal Ein can be correctly reproduced even when the signal Ein is considerably complicated. In the present invention, here, variations in the angle with respect to the basic axes and the magnitude of the received-wave signal Ein are detected according to the present invention. That is, the intermediate signals E1 and E1a are provided to an angular momentum detecting circuit 19, in which the signals provided are subjected to a sampling at every time point, and an angle $\theta(t)$ of the received-wave signal Ein with respect to the axes E1 in FIG. 3 is obtained at each time point t, the basic vector of the signal Ein being the intermediate signal E0 of the phase shifter 14. This angle $\theta(t)$ is obtained through a following formula, from the intermediate signals E1(t) and E1a(t) at the time point t:

$$\theta(t)=\tan^{-1}\{E1a(t)/E1(t)\}$$

The angular momentum detecting circuit 19 is here set to be capable of detecting the angle upon receiving an output of the OR circuit 18 provided when a fixed signal level is reached by at least one of the intermediate signals E1 and E1a as detected by the level detecting circuits 17 and 17a. So long as the level of the both intermediate signals E1 and E1a is below the fixed level, the angular momentum detecting circuit 19 is reset. An output of this circuit 19 is provided to an operation circuit 20, and any time series variation component, that is, the amount of variation and the polarity of the angle of the received-wave signals from the time point ti $-1$ to the time point ti will be obtained through a following formula:

$$\Delta\theta(ti)=\theta(ti)-\theta(ti-1)$$

in which i=1, 2, 3 and so on. $\Delta\theta(ti)$ thus obtained is provided to a signal processing circuit 21 to be sequentially added therein, as a result of which the received-wave signal Ein is made acknowledgeable in respect of the extent of its deviation in the vector plane even when the signal does not shift across two of quadrants of the vector plane, that is, even when the signal shifts only within a single quadrant and, when the result of the addition exceeds the present threshold value, a detection signal therefor is provided to an indicator driving circuit 22 to have the presence of the moving object made recognizable.

The signal processing performed in the circuit 21 may be made in such that, order than the sequential addition of the angular variation components as in the foregoing, only the polarity of the angular variation component at every time point is detected so that +1 will be given for positive components but −1 for negative components, such given values are sequentially added and, when their total has exceeded a predetermined threshold value, a detection signal is provided. In other words, the detection output will be obtained when a difference between numbers of appearance of the respective positive and negative components has reached above the predetermined value. Further, the angular momentum detecting circuit 19, operation circuit 20 and signal processing circuit 21 may be formed either in respectively individual circuit arrangement or in integral arrangement employing a microcomputer assembled with a software for carrying out the foregoing operation.

According to another feature of the present invention, there is provided an arrangement for detecting the moving distance of the object by obtaining the number of shift in the quadrants of the vector plane, taking into account that the frequency deviation component in the received-wave signal Ein from the moving object present in the supervisory zone, that is, Doppler signal frequency $\Delta f$ is $$|\Delta f| = 2v\, fo/c$$

where v being the velocity of the moving object, c being propagating speed of the energy waves and fo being the ultrasonic wave frequency, and is thus in proportion to the velocity v of the moving object, and that the number N of Doppler signal waves generated upon the movement of the object over a unit distance will be, based on the above formula, $$N = 2fo/c$$

so that, so long as the propagating speed c of the energy waves and ultrasonic wave frequency fo are constant, the wave number N will be constant irrespective of the velocity of the moving object so as to be also constant in the number of shift in the vector plane and, when the vector plane is divided into four quadrants (or eight quadrants), the shift of $4 \times N$ times (or $8 \times N$ times) take place. It should be appreciated in this connection that the angle of shift in the vector plane can be detected by the addition and subtraction of the shift number on the basis of the shifting direction, so that the moving distance and direction of the object can be obtained.

Figure 4:
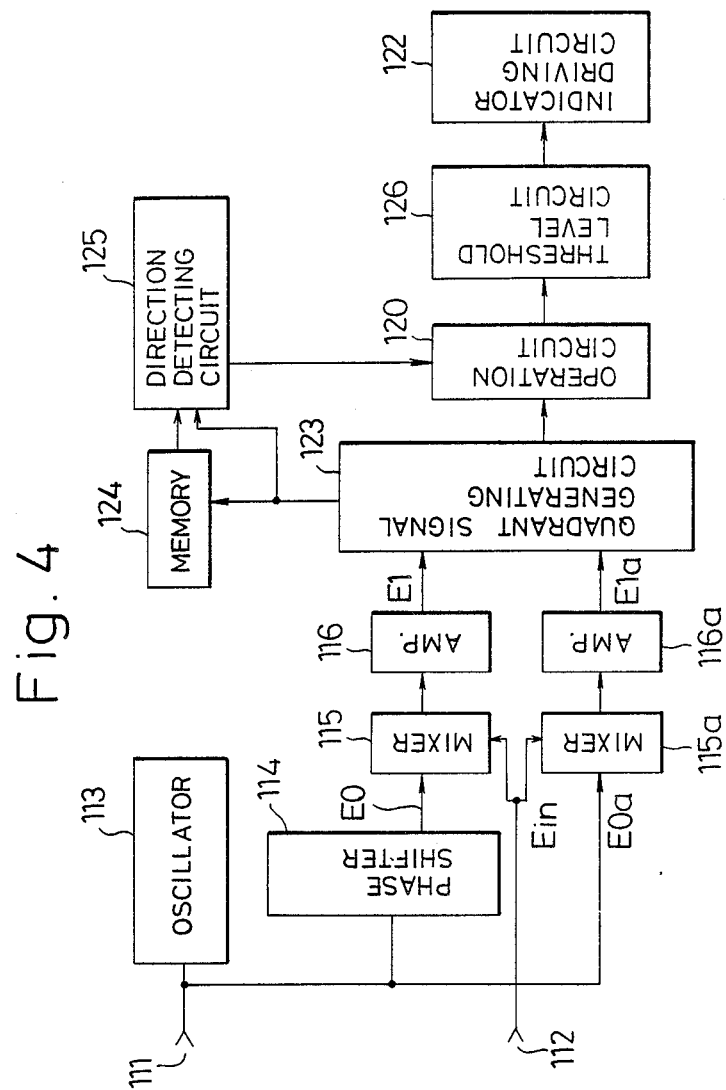
FIG. 4 is a block diagram of the device in another embodiment of the present invention.

Referring more in details to this arrangement by reference to FIG. 4, substantially the same components as those in FIG. 1 are denoted in FIG. 4 by the same reference numerals but added by 100. Similarly to the case of FIG. 1, the intermediate signals E1 and E1a are provided as amplified through amplifiers 116 and 116a, and these intermediate signals E1 and E1a are provided to a quadrant signal generating circuit 123, in which any one of the quadrants in which the received-wave signal Ein is present in the vector plane the basic axes of which are the intermediate signals E1 and E1a are detected. When the vector plane is divided into four quadrants for the quadrant detection, such discrimination as shown in following TABLE I is carried out in the quadrant signal generating circuit 123, and quadrant signals I through IV are thereby provided:

TABLE I

| E1 | E1a | Quadrant Signal |
|---|---|---|
| + | + | I |
| − | + | II |
| − | − | III |

TABLE I-continued

| E1 | E1a | Quadrant Signal |
|---|---|---|
| + | − | IV |

When the vector plane is divided much more, such discrimination as in following TABLE II is carried out in the circuit 123:

TABLE II

| Conditions | Quad. Sig. |
|---|---|
| E1, +; E1a, +; $|E1| \geq |E1a|$ | Ia |
| E1, +; E1a, +; $|E1| < |E1a|$ | Ib |
| E1, −; E1a, +; $|E1| \leq |E1a|$ | IIa |
| E1, −; E1a, +; $|E1| > |E1a|$ | IIb |
| E1, −; E1a, −; $|E1| \geq |E1a|$ | IIIa |
| E1, −; E1a, −; $|E1| < |E1a|$ | IIIb |
| E1, +; E1a, −; $|E1| \leq |E1a|$ | IVa |
| E1, +; E1a, −; $|E1| > |E1a|$ | IVb |

It will be appreciated here that a division of the vector plane into a larger number of quadrants, to be more than 16 quadrants, the detection of the moving object can be more improved in the precision.

Figure 5:
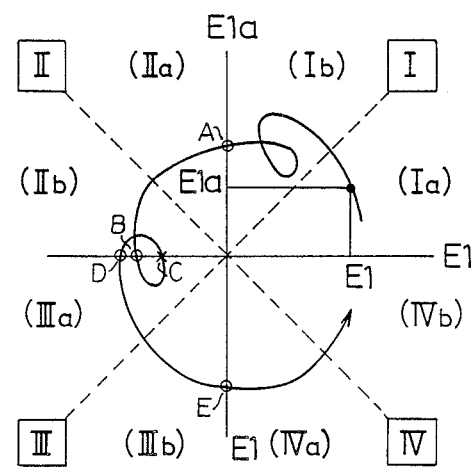
FIG. 5 is a diagram for explaining the operation of the device of FIG. 4.

The quadrant signals I through IV provided out of the quadrant signal generating circuit 123 are given to a memory circuit 124 to be temporarily stored therein, and also to a shifting direction detecting circuit 125 to be therein compared with previous data signals stored previously in the memory circuit 124 to detect in which direction in the vector plane the received-wave signals shift, and the circuit 125 provides an output instructing an addition for a shift in a sequence of, for example, the quadrants I-II-III . . . , regarded the same as "+" rotation, and another output instructing a subtraction for a shift in reverse sequence, regarded the same as "−" rotation. From the quadrant signal generating circuit 123, further, a shift signal is provided to an operation circuit 120 to which an output signal of the shifting direction detecting circuit 125 is also provided so that the number of shift will be obtained through addition and subtraction operation. Provided that a received-wave signal vector draws such a locus as shown by a solid line curve in FIG. 5, there will be operated an addition in an event where the vector shifts in leftward, that is, from a first quadrant to a second quadrant but a subtraction in an event of a rightward shift, that is, from the first quadrant I to a fourth quadrant IV. In other words, the addition is carried out at points A, B, D and E where the vector intersects the axis E1 or E1a but the subtraction at point C.

Figure 6:
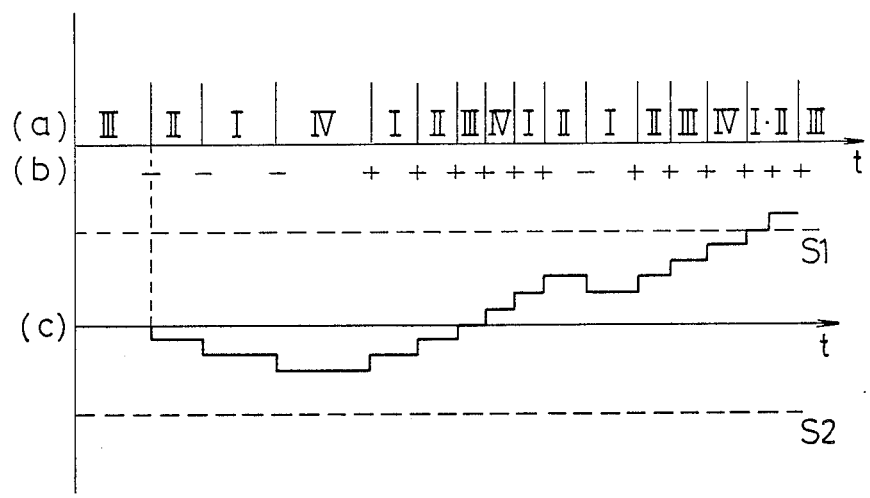
FIG. 6 is a wave-form diagram taken at main parts in the device of FIG. 4.

Referring also to FIG. 6, the quadrant signal generating circuit 123 is providing such signals as shown by (a) of FIG. 6 which respectively denoting each quadrant in which the received-wave signal vector is present with respect to the basic axes of the Doppler signals, that is, the intermediate signals E1 and E1a, while the shifting direction detecting circuit 125 provides, upon occurrence of the quadrant shift in the received-wave signal vector, such "+" or "−" signal as in (b) of FIG. 6 as a result of the comparison with the previous data stored in the memory circuit 124. In the operating circuit 120, therefore, the number of shift took place is obtained through the addition or subtraction as shown by (c) in FIG. 6 and, when the resulting value of the addition or subtraction exceeds a preliminarily set threshold value S1 or S2 in a threshold level circuit 126, a detection signal is provided from the circuit 126 to the indicator driving circuit 122 so as to have the presence of the moving object made to be acknowledgeable by the indicator.

Also in this arrangement of the present embodiment, the wave number N of the Doppler signals will be proportional to moving distance of the object as in the above but is not influenced at all by the level or frequency Δf of the Doppler signal so that, if the threshold values S1 and S2 are set taking into account the moving distance of the object, the moving object can be detected at high precision irrespective of the velocity of the moving object.

Figure 7:
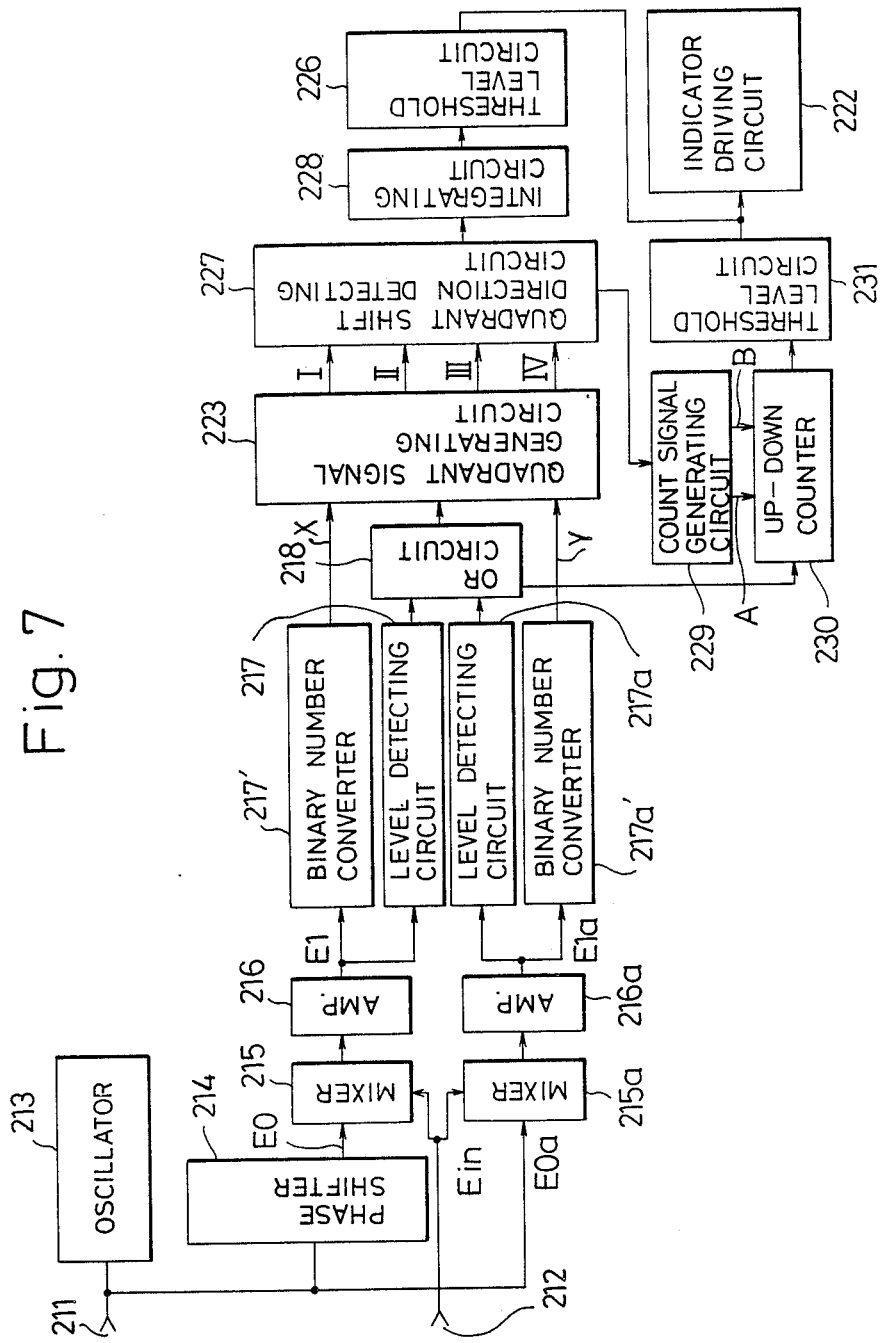
FIG. 7 is a block diagram showing still another embodiment of the device according to the present invention.

According to still another feature of the present invention, there can be provided a moving object detecting device which performs the high precision detection even when the moving velocity of the object is extremely high. Referring now to FIG. 7, substantially the same components as in FIG. 1 or 4 are represented by the same reference numerals but added by 200 or 100 and, in the same manner as in the foregoing embodiment, the intermediate signals E1 and E1a are provided through amplifiers 216 and 216a. Also in the same manner as in FIG. 1, the intermediate signals E1 and E1a are provided, through level detecting circuits 217 and 217a, to OR circuit 218 to obtain the logic sum. At the same time, the intermediate signals E1 and E1a are also provided to binary number converters 217' and 217a' to be converted into binary numbers X and Y. An output of the OR circuit 218 representing the presence or absence of the moving object in the supervisory zone as well as outputs of the binary number converters 217' and 217a' providing the quadrant signals of the received-wave signal vector with the intermediate signals E1 and E1a employed as the basic axes are provided to a quadrant signal generating circuit 223 as its inputs.

In this quadrant signal generating circuit 223, any one of quadrant signals I through IV which corresponds 1:1 to any one of the quadrants in which the received-wave signal Ein is present in the vector plane will be generated in the form of a combination of the binary numbers X and Y, and will be conveyed to a quadrant shift direction detecting circuit 227. In the quadrant shift direction detection circuit 227 a discrimination is made from which quadrant the quadrant signal has shifted at every time point to generate a positive or negative signal depending on the shift direction. Such outputs of the direction detecting circuit 227 are integrated at an integrating circuit 228 outputs of which are provided to a threshold level circuit 226 having a preset threshold level so that, whenever the integration output level exceeds the set threshold level, an output will be provided to the indicator driving circuit 222 and the presence of the moving object will be made acknowledgeable.

In the present embodiment, on the other hand, the output of the quadrant shift direction detecting circuit 227 is also provided to a count signal generating circuit 229 in which an up-count pulse signal A or down-count pulse signal B is prepared to be provided to an up-down counter 230. The shift wave number of the received-wave signal's vector is counted by this up-down counter 230 so as to be able to calculate the moving distance when the moving object moves in the same direction and, when the shift wave number exceeds a present threshold level of the other threshold level circuit 231, an output is provided to the indicator driving circuit 222.

All matters explained with reference to FIGS. 2 and 3 in respect of the moving object detecting device of FIG. 1 are applicable to the present embodiment, so that even a considerably complicated received-wave signal Ein can be correctly reproduced and any variation with respect to the basic axes of the received-wave signal Ein can be detected.

More practically, the binary signals X and Y are also combined and the quadrant signals I through IV are generated as shown in following TABLE III:

TABLE III

| X | Y | I | II | III | Iv | |
|---|---|---|----|-----|-----|---|
| 1 | 1 | 0 | 1 | 1 | 1 | |
| 0 | 1 | 1 | 0 | 1 | 1 | When the vector is more than a fixed. |
| 0 | 0 | 1 | 1 | 0 | 1 | |
| 1 | 0 | 1 | 1 | 1 | 0 | |
| 1 or 0 | 1 or 0 | 1 | 1 | 1 | 1 | When the vector is below the fixed. |

In the above TABLE III, the signal "1" denotes the absence of the received-wave signal Ein in corresponding one of the quadrants while the signal "0" denotes the presence of the signal in the corresponding quadrant, and these signals are provided to the quadrant shift direction detecting circuit 227 to have the quadrant signals temporarily stored and, a shift to a new quadrant, the direction of such shift is to be detected. For the storing in the direction detecting circuit 227, a pair of R-S flip-flops FF1 and FF2 are employed, and outputs of the flip-flops FF1 and FF2 accompanying the binary numbers X and Y and quadrant signals I through IV will be as shown in following TABLE IV:

TABLE IV

| X | Y | Quad. Sig. | FF1 Output p,q | FF2 Output r,s |
|---|---|-----------|----------------|----------------|
| 1 | 1 | I | 1, 0 | no change |
| 0 | 1 | II | no change | 1, 0 |
| 0 | 0 | III | 0, 1 | no change |
| 1 | 0 | IV | no change | 0, 1 |

Figure 8:
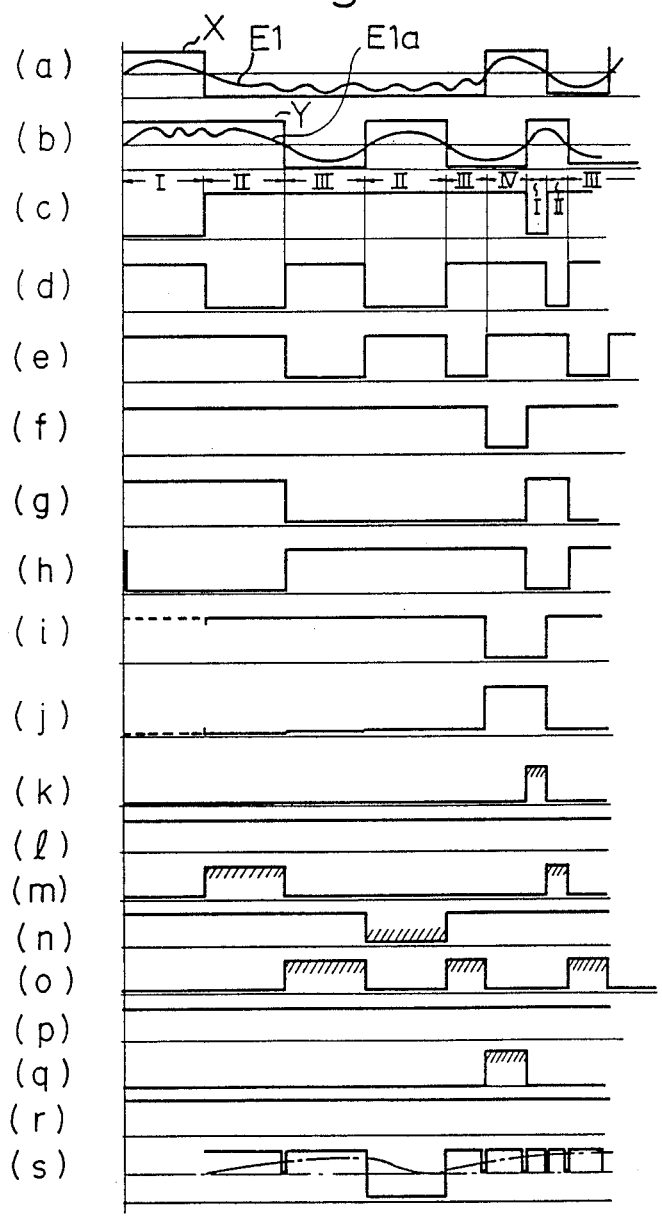
FIG. 8 is a diagram showing wave-forms at main parts in the device of FIG. 7.

Referring more in details to the above by reference to FIG. 8, wave-forms (a) and (b) in FIG. 8 represent the intermediate signals E1 and E1a and the binary signals X and Y, respectively, and, when the binary signals X,Y are (1,1), the signal in the first quadrant I will be as a curve (c) of FIG. 8, when the signals are (0,1), the second quadrant II signal will be as a curve (d), when (0,0), the third quadrant III signal will be as a curve (e), and, when (1,0), the fourth quadrant IV signal will be as a wave-form (f). Here, the foregoing flip-flop FF1 is reversed by the quadrant signals I and III to generate such outputs p and q as wave-forms (g) and (h) in FIG. 8, while the flip-flop FF2 is actuated by the quadrant signals II and IV to generate such outputs r and s as wave-forms (i) and (j) in FIG. 8. These outputs are processed at the direction detecting circuit 227, as shown by wave-forms (k) through (r) in FIG. 8, upon which the foregoing TABLE IV as presented by the quadrant shifting direction will be as in following TABLE V:

TABLE V

| Quad. Sig. | p | q | r | s | Quad. Sig. | p | q | r | s |
|-----------|---|---|---|---|-----------|---|---|---|---|
| I | 1 | 0 | 0 | 1 | IV | 1 | 0 | 0 | 1 |
| II | 1 | 0 | 1 | 0 | III | 0 | 1 | 0 | 1 |
| III | 0 | 1 | 1 | 0 | II | 0 | 1 | 1 | 0 |
| IV | 0 | 1 | 0 | 1 | I | 1 | 0 | 1 | 0 |
| I | 1 | 0 | 0 | 1 | IV | 1 | 0 | 0 | 1 |

Further, the above FF1 and FF2 outputs p, q, r and s will be as in following TABLE VI:

TABLE VI

| X | Y | Quad. Sig. | Output |
|---|---|---|---|
| 1 | 1 | I | s |
| 0 | 1 | II | p |
| 0 | 0 | III | r |
| 1 | 0 | IV | q |

Such outputs as in the above TABLE VI, that is, the outputs of the quadrant shift direction detecting circuit 227 as shown by a wave-form (s) in FIG. 8 will be provided to the circuit of the following stage.

Figure 9:
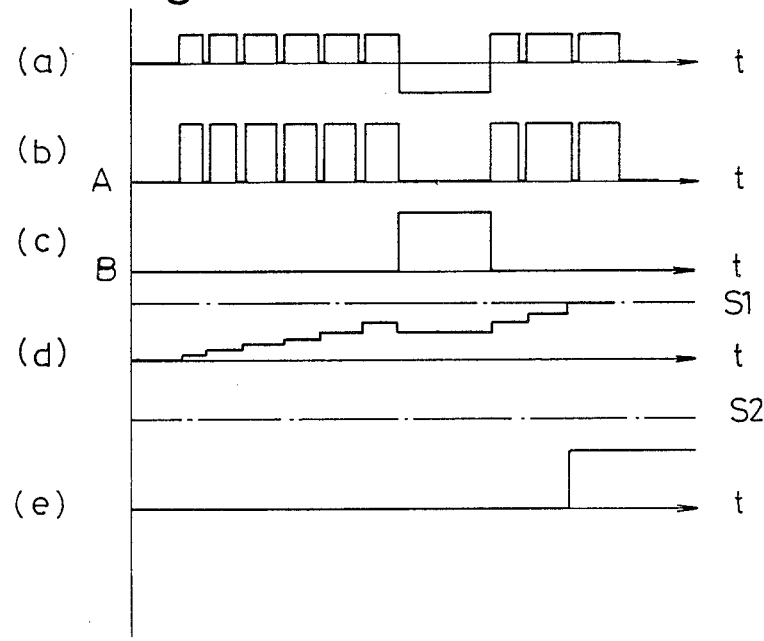
FIG. 9 is a diagram showing further operating wave-forms at other main parts in the device of FIG. 7.

Responsive to such input as shown in FIG. 9(a) provided to the count signal generating circuit 229 upon every shift in the quadrants, there are prepared in this circuit 229 such positive signals forming the up-count pulse signal A as in FIG. 9(b) and such negative signals forming the down-count pulse signal B as in FIG. 9(c), which are processed through the addition and subtraction at the up-down counter 230, as shown in FIG. 9(d) so that, when the preset threshold levels S1 and S2 of the circuit 231 are exceeded, such driving output as in FIG. 9(e) will be provided to the indicator driving circuit 222.

According to the present invention, further, another type of the moving object detecting device is provided for highly precisely detecting the moving object irrespective of the velocity of the moving object. Referring to FIG. 10, wave radiator 311 receives output signals from an oscillating circuit 313, the output signals of which circuit 313 are also provided to a mixer 315 to which the received-wave signal from a wave receiver 312 is provided, and to a frequency discrimination circuit 332. An output of the mixer 315 is provided through an amplifier 316 to an operation circuit 320 to which an output of the frequency discrimination circuit 332 is also provided, while an output of the operation circuit 320 is provided to a threshold circuit 326 and, when a preset threshold level in this circuit 326 is exceeded by the output of the operation circuit 320, an output will be provided to an indicator driving circuit 322.

In the present embodiment, the frequency discrimination circuit 332 is so designed as to provide an "H" level output when, for example, the frequency of the received-wave signal is higher than that of the radiated wave signal, that is, the moving object is approaching the wave receiver 312, but as to provide an "L" level output when the received-wave signal frequency is lower than that of the radiated wave signal, that is, the moving object is separating from the wave receiver 312. Upon "H" level output signal of the frequency discrimination circuit 332, therefore, the Doppler signals provided from the mixer 315 through the amplifier 316 to the operation circuit 320 will be added upon every zero-crossing of the signals, whereas the "L" level output signal of the circuit 332 causes the Doppler signals sequentially subtracted upon every zero-crossing thereof. That is, the result of the operation at the operation circuit 320 is made to be proportional to the number of the zero-crossing of the Doppler signals or, in other words, the number of waves of the Doppler signals, and it is made possible to detect reliably the moving object with a simpler arrangement, by properly setting the threshold level in the threshold level circuit 326 taking into account the moving velocity of the object, similarly to the case of the embodiment of FIG. 4.

What we claim as our invention is:

1. A moving object detecting device comprising:
means for oscillating at a predetermined frequency, a wave radiator for receiving an output of said oscillating means and radiating continuous energy waves to a supervisory zone, a wave receiver on which reflected waves of said continuous energy waves radiated by said wave radiator and back from an object in said supervisory zone are made incident, a converter connected to said wave receiver for converting a frequency deviation component of a received-wave signal from the receiver into a pair of intermediate signals which are mutually different in phase, means connected to said converter for detecting quadrants in which a received-wave signal vector is present in a vector plane the basic axes of which are said pair of intermediate signals, temporary storing means connected to said quadrant detecting means for temporarily storing detected quadrant signals therefrom, means receiving said quadrant signals to compare them with data signals previously stored in said temporary storing means for detecting a direction of a shift in quadrants, means receiving an output from said quadrant shift direction detecting means for operating to obtain addition and subtraction of quadrant shifts to determine the number of quadrant shifts which have taken place, and means receiving an output provided from said operating means when said output has exceeded a preset threshold level for indicating detected information on the moving object.

2. A device according to claim 1, wherein said operating means operates to obtain the addition or subtraction of the number of quadrant shifts in said received-wave signal vector which have taken place in the same or opposite direction, respectively.

3. A device according to claim 1, wherein said quadrant shift direction detecting means generates positive and negative signals indicative of shifting direction of a vector of said received-wave signal, said positive and negative signals forming said output received by said operating means, said device further including additional means for receiving said positive and negative signals from said quadrant shift direction detecting means and for integrating these signals, an output of said integrating means being provided to said indicating means when said integrating means output has exceeded a preset threshold level, said indicating means being actuated by an output provided from either said operating means or said integrating means.

* * * * *